(12) United States Patent
Prough

(10) Patent No.: US 6,257,489 B1
(45) Date of Patent: Jul. 10, 2001

(54) APPARATUS AND METHODS FOR NON-CONTACT COIL FORM SPREAD MEASUREMENT

(75) Inventor: David M. Prough, Leo, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/144,828

(22) Filed: Sep. 1, 1998

Related U.S. Application Data

(60) Provisional application No. 60/077,810, filed on Mar. 12, 1998.

(51) Int. Cl.[7] .............................. G06K 7/10; G06K 15/00
(52) U.S. Cl. ................................ 235/462.13; 235/462.01
(58) Field of Search .................................... 235/380, 375, 235/454, 462.01, 462.13; 140/92.1

(56) References Cited

U.S. PATENT DOCUMENTS

| | | |
|---|---|---|
| 3,508,316 | 4/1970 | Hill . |
| 3,973,601 | 8/1976 | Arnold et al. . |
| 3,977,444 | 8/1976 | Lauer et al. . |
| 4,393,904 | 7/1983 | Muskulus . |
| 4,719,948 | 1/1988 | Tsugawa . |
| 5,490,318 | 2/1996 | Kleinschmidt . |
| 5,504,315 | 4/1996 | Hardesty et al. . |
| 5,647,405 | 7/1997 | Fichtner et al. . |

FOREIGN PATENT DOCUMENTS 653688    6/1974   (SU) .

*Primary Examiner*—Karl D. Frech
(74) *Attorney, Agent, or Firm*—Armstrong Teasdale LLP; Damian Wasserbauer; Carl B. Horton

(57) ABSTRACT

Non-contact coil form measurement and control apparatus for measuring the spread of a coil forms includes a bar code scanner for determining the relative positions of the coil forms. More particularly, the bar code scanner is mounted to the winding machine at a location which enables the scanner to scan both forms. The scanner may be coupled to the winding machine controller which controls operation of the winding machine. A target, such as a bar code, is positioned on each coil form. In operation, when a particular stator configuration is to be fabricated, the operator enters the stator configuration identification into the winding machine controller. The scanner then scans the bar codes located on the forms to determine the coil form separation. In the event that the coil forms are incorrectly set, the controller interface informs the operator of this condition and instructs the operator to set the coil form spread. Once the operator has reset the coil form spread, the operator enters a command into the winding machine controller which results in the bar code scanner once again scanning the coil forms. The above process is repeated until the coil forms are set at the correct spread. When the forms are set to the correct spread, then winding operations can continue.

19 Claims, 1 Drawing Sheet

APPARATUS AND METHODS FOR NON-CONTACT COIL FORM SPREAD MEASUREMENT

CROSS REFERENCE TO RELATED APPLICATION

This application claims the benefit of U.S. Provisional Application No. 60/077,810, filed Mar. 12, 1998.

FIELD OF THE INVENTION

This invention relates generally to winding machines for fabricating stator windings and, more particularly, to apparatus and methods for accurately measuring and controlling the spread of coil forms in a winding machine.

BACKGROUND OF THE INVENTION

The stator of a dynamoelectric machine such as an electric motor or generator typically includes a core of magnetic material having an axially extending bore for receiving a rotor. The core typically is formed from a plurality of identical laminations which are aligned and arranged in a stack held together by clips. Each lamination includes a plurality of teeth which extend radially into the bore. Slots between each of the teeth extend radially outwardly from the bore. The ends of the teeth and the open ends of the slots define the periphery of the bore.

A plurality of coils formed from insulated conductive wire are inserted into selected core slots with portions of the coils at the ends of the core forming end turn regions. The coils are interconnected to form coil groups or poles. The conductive wires which form the coils, are sometimes referred to as stator windings. As an example, a single speed motor typically includes coil groups which establish at least one main winding and an auxiliary or start winding.

To insert the coils into the stator core slots, it is known to form coil groups with coil forms in a winding machine, locate the coil groups on coil insertion (or injection) tooling, and then move the coil groups from the coil insertion tooling to a stator with portions thereof located in stator slots. Winding machines including coil forms are described, for example, in U.S. Pat. No. 3,977,444, which is assigned to the present assignee.

Known winding machines typically include two coil forms separated by a preselected distance, and a flyer arm which rotates around the forms. The windings are formed as the flyer arm wraps the insulated wire on segments of the forms. In order to ensure that the resulting windings have the desired dimensions for a particular stator configuration, the coil forms must be separated at a precise separation distance. This distance is sometimes referred to as winding or coil form spread.

Currently, an operator uses various blocks cut to specific dimensions to set the coil form spread. Specifically, and depending upon the particular windings to be formed, the operator selects the corresponding block. The operator locates the block between the forms and then sets the forms so that the forms correspond to the particular block size. In the event that an incorrect coil form spread is selected by the operator, it may be necessary to discard any stators fabricated using the windings wound on the incorrectly set forms.

It would be desirable to provide apparatus and methods for setting the coil form spread which do not rely upon the experience and knowledge of an operator and which provide accurate and consistently correct coil form spreads. It also would be desirable to provide such apparatus and methods which are inexpensive to implement and can be utilized in connection with existing winding machines.

SUMMARY OF THE INVENTION

These and other objects may be attained by non-contact coil form spread measurement and control apparatus which, in one embodiment, includes a bar code scanner for determining the relative positions of the coil forms. More particularly, the bar code scanner is mounted to the winding machine at a location which enables the scanner to scan both forms. The scanner may be coupled to the winding machine controller which controls operation of the winding machine. A target, such as a bar code, is positioned on each coil form.

In operation, when a particular stator configuration is to be fabricated, the operator enters the stator configuration identification into the winding machine controller. The scanner then scans the bar codes located on the forms to determine the coil form separation. In the event that the coil forms are incorrectly set, the controller interface informs the operator of this condition and instructs the operator to set the coil form spread. Once the operator has reset the coil form spread, the operator enters a command into the winding machine controller which results in the bar code scanner once again scanning the coil forms. The above process is repeated until the forms are set at the correct spread. When the forms are set to the correct spread, then winding operations can continue.

The above described apparatus and methods do not rely upon the experience and knowledge of an operator, and are believed provide accurate and consistently correct coil form spreads. Such apparatus and methods also are inexpensive to implement and can be utilized in connection with existing winding machines.

DETAILED DESCRIPTION

Figure 1:
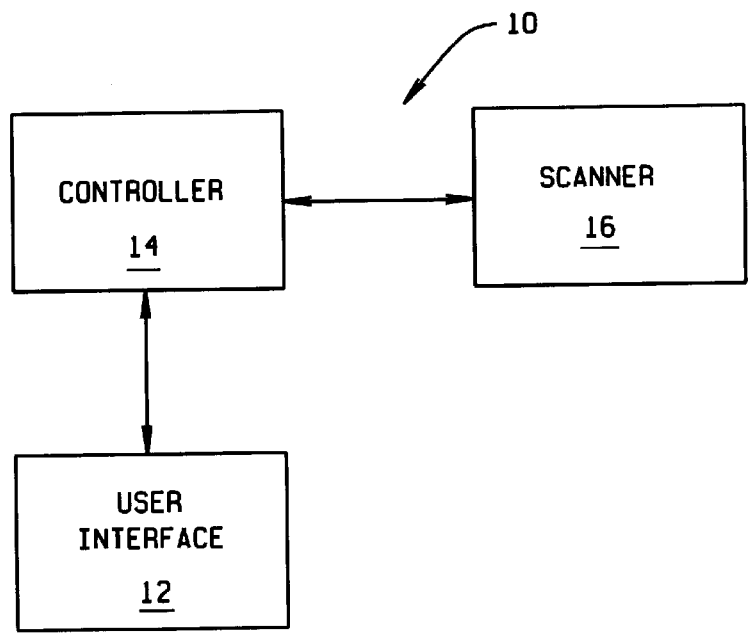
FIG. 1 is a block diagram illustration of one embodiment of the present invention.

FIG. 1 a block diagram description of a winding machine 10 configured in accordance with one embodiment of the present invention. Particularly, winding machine 10 includes a user interface 12 coupled to a controller 14. User interfaces and controllers are well known, and machine 10 can be configured substantially in accordance with known winding machines such as the machine described in U.S. Pat. No. 3,977,444, which is assigned to the present assignee and incorporated herein, in its entirety, by reference.

User interface 12 enables an operator to supply commands and data to controller 14, which then controls various components of winding machine 10. Controller 14 includes a memory, and motor model information is stored in the controller memory. For example, a desired coil form spread for each motor model is stored in the controller memory. In addition, the scan speed of scanner 16 and the distance of scanner 16 from the targeted measurement (point to point) also are stored in the controller memory.

As shown in FIG. 1, machine 10 also includes a scanner 16 which, in one embodiment, is a bar code scanner. Bar code scanners are well known and commercially available, and such well known bar code scanners may be modified to generate a recognition signal indicative of detection of one of the targets on one of the coil forms. Generally, scanner 16 can be any type of non-contact type scanner capable of detecting spaced apart targets.

Scanner 16 may be mounted adjacent the coil forms so that scanner 16 can scan locations on both forms. Scanner 16 is coupled to controller 14, and controller 14 is configured to determine coil form spread based, in part, on recognition signals output by scanner 16, as described below in more detail.

Figure 2:
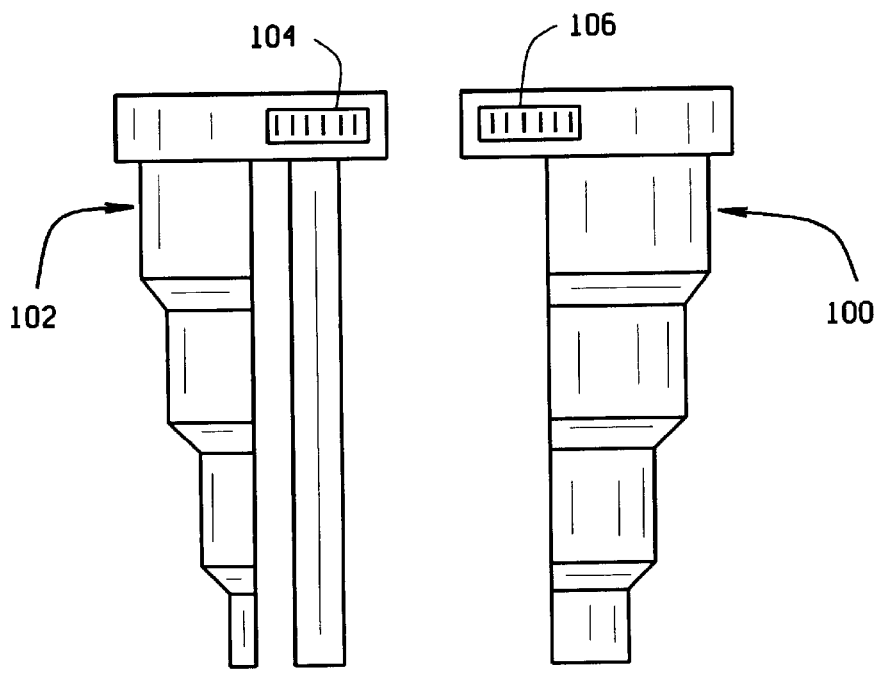
FIG. 2 is a schematic illustration of two coil forms including bar codes.

FIG. 2 is a schematic illustration of coil forms 100 and 102. Coil forms 100 and 102 are spaced apart by a spread. Targets 104 and 106 are located on forms 100 and 102. As shown in FIG. 2, targets 104 and 106 may be bar codes. Targets 104 and 106 may, of course, be any other type of target recognizable by scanner 16. Bar codes can be easily and readily secured to existing coil forms using, for example, an adhesive. In an exemplary embodiment, scanner 16 is positioned approximately 24 inches from bar code 104, and bar codes 104, 106 have approximate dimensions of about one inch by about one half of an inch.

In operation, an operator supplies controller 14, via user interface 12, with information regarding the particular motor model to be fabricated. Controller 14 then enables scanner 16 to perform a scan. Scanner 16 first detects a first target on one of the forms and then scans across to another coil form and detects a second target on that form.

Using the recognition signals from scanner 16, controller 14 determines coil form spread. Specifically, controller 14 determines coil form spread based on a period of elapsed time between detection of the first target and detection of the second target. Since the scan speed of scanner 16 is known, the distance of scanner 16 from the targeted measurement (point to point) is known, and the time of target recognition between the targets is known, the form spread can be accurately determined using, for example, well known triangulation formulas. If the coil form spread determined by controller 14 does not match the coil form spread for the motor model stored in the controller memory, controller 14 generates a signal to indicate an error in the coil form setting.

An error message is then displayed on user interface 12 and the operator adjusts the coil forms. After adjusting the coil forms, the operator inputs a command indicating that the coil forms have been adjusted, and controller 14 once again enables scanner 16 to perform a scan. The process is repeated until the coil form spread determined by controller 14 matches the coil form spread for the selected motor model. When such a match is achieved, machine 10 proceeds with forming the coils.

The above described apparatus and methods do not rely upon the experience and knowledge of an operator, and are believed to provide accurate and consistently correct coil form spreads. Such apparatus and methods also are inexpensive to implement and can be utilized in connection with existing winding machines.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A winding machine comprising at least two coil forms having targets thereon, and apparatus for determining coil form spread, said apparatus comprising:
    a scanner for sensing said targets; and
    a controller coupled to said scanner configured to determine coil form spread based on data output by said scanner.

2. A winding machine in accordance with claim 1 wherein said targets comprise bar codes.

3. A winding machine in accordance with claim 1 wherein said scanner comprises a bar code scanner.

4. A winding machine in accordance with claim 1 wherein data output by said scanner comprises a recognition signal indicative of detection of one of said targets.

5. A winding machine in accordance with claim 4 wherein said controller determines coil form spread based on a period of elapsed time between detection of a first target and detection of a second target.

6. Apparatus to determine separation distances between coil forms of a winding machine, said apparatus comprising:
    a plurality of targets, at least one target configured to be located on one of the coil forms and at least one target configured to be located on another coil form;
    a scanner configured to generate a recognition signal when one of said targets is detected; and
    a controller coupled to said scanner configured to determine coil form spread based on data output by said scanner.

7. Apparatus in accordance with claim 6 wherein said targets comprise bar codes.

8. Apparatus in accordance with claim 6 wherein said scanner comprises a bar code scanner.

9. Apparatus in accordance with claim 6 wherein data output by said scanner comprises a recognition signal indicative of detection of one of said targets.

10. Apparatus in accordance with claim 9 wherein said controller determines coil form spread based on a period of elapsed time between detection of a first target and detection of a second target.

11. Apparatus in accordance with claim 6 further comprising a user interface coupled to said controller.

12. Apparatus in accordance with claim 6 wherein said controller comprises a memory, motor model information stored in said controller memory, said motor information comprising coil form spread for a plurality of motor models.

13. Apparatus in accordance with claim 12 wherein if a coil form spread determined by said controller does not match the coil form spread for the motor model stored in said memory, said controller generates a signal to indicate an error in the coil form setting.

14. A method of operating a winding machine which includes at least two coil forms, and apparatus for determining coil form spread, said method comprising the steps of:
    identifying a desired coil form spread;
    enabling the apparatus to determine the coil form spread utilizing a scanner; and
    comparing the desired coil form spread and the determined coil form spread by utilizing information obtained by the scanner.

15. A method in accordance with claim 14 wherein the winding machine further includes controller having a memory, motor model information stored in the controller memory, and a user interface coupled to the controller for enabling an operator to input information to the controller, and wherein identifying a desired coil form spread comprises the step of determining the desired coil form spread from the information stored in the controller memory and from user supplied information.

16. A method in accordance with claim 14 wherein if the determined coil form spread does not match the desired coil form spread, then generating a signal to indicate an error in the coil form setting.

17. A method for setting coil form spread for coil forms of a winding machine, the winding machine including at least two coil forms separated by a distance, a bar code located on each form, and a bar code scanner, said method comprising the steps of:

reading the bar codes with the bar code scanner; and determining the separation distance between the forms by information obtained by the scanner.

18. A method in accordance with claim 17 further comprising the step of comparing the separation distance of the forms to a desired coil form spread.

19. A method in accordance with claim 18 further comprising the step of adjusting the separation distance based on information obtained from comparing the separation distance of the forms to desired coil form spread.

* * * * *